United States Patent [19]

Lazzari et al.

[11] 4,198,667

[45] Apr. 15, 1980

[54] MAGNETIC HEAD PLATFORM INCORPORATING AT LEAST ONE INTEGRATED TRANSDUCER

[75] Inventors: Jean P. Lazzari, Montfort l'Amaury; Jean Desserre, Rambouillet, both of France

[73] Assignee: Compagnie Internationale pour l'Informatique, Paris, France

[21] Appl. No.: 882,592

[22] Filed: Mar. 2, 1978

[30] Foreign Application Priority Data

Mar. 18, 1977 [FR] France .............................. 77 08168

[51] Int. Cl.² .......................... G11B 5/12; G11B 5/27; G11B 5/22

[52] U.S. Cl. .................................... 360/123; 360/121; 360/125

[58] Field of Search ............... 360/123, 125, 121, 126, 360/119–120, 122

[56] References Cited

U.S. PATENT DOCUMENTS

| | | | |
|---|---|---|---|
| 3,271,751 | 9/1966 | Proebster | 360/123 |
| 3,344,237 | 9/1967 | Gregg | 360/123 |
| 3,521,258 | 7/1970 | Hurt, Jr. | 360/123 |
| 3,805,291 | 4/1974 | Sakurai | 360/123 |
| 3,829,896 | 8/1974 | Brock et al. | 360/125 |
| 4,052,749 | 10/1977 | Nomura et al. | 360/123 |
| 4,072,993 | 2/1978 | Nomura et al. | 360/121 |
| 4,092,688 | 5/1978 | Nomura et al. | 360/121 |

*Primary Examiner*—Alfred H. Eddleman
*Attorney, Agent, or Firm*—Cameron, Kerkam, Sutton, Stowell & Stowell

[57] ABSTRACT

A method of producng magnetic head-carrying platforms for supporting one or more integrated transducers arranged on an insulative base and having electrical output strips and an insulating protective member covering the transducer and the output strips provides for joining of the protective member to a substrate with the output strips disposed between the substrate and the member. The surface is treated to expose the ends of the strips which extend beyond the treated surface such that connections to the ends of the output strips may be made by superimposed conductive layers deposited on the treated surface of the substrate. In the fabricated platforms some transducers are in partial alignment in a common plane parallel to the axis of the conductive layers so that at least one output strip of those transducers in partial alignment may be connected by a common output conductive connector. The outermost layer of the deposited output connector strips may be a relatively thick layer to facilitate connection to a flexible connector.

25 Claims, 13 Drawing Figures

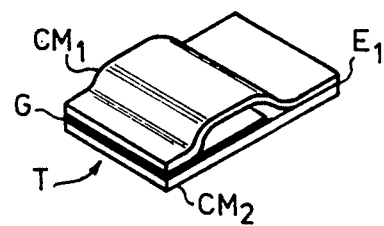
FIG:1a PRIOR ART
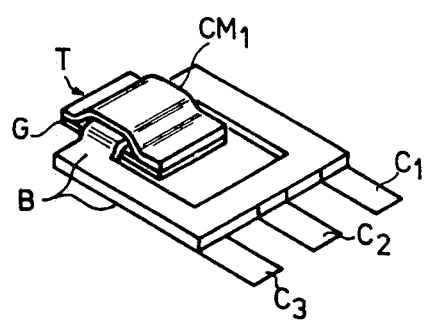
FIG:1b PRIOR ART
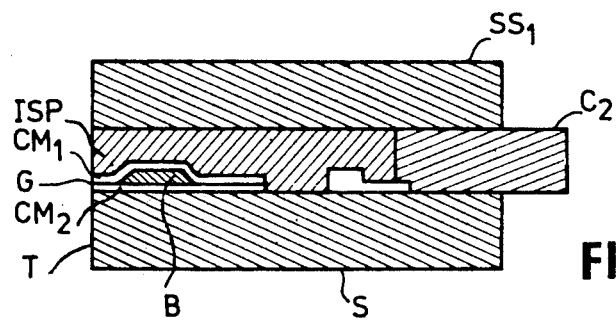
FIG:1c PRIOR ART
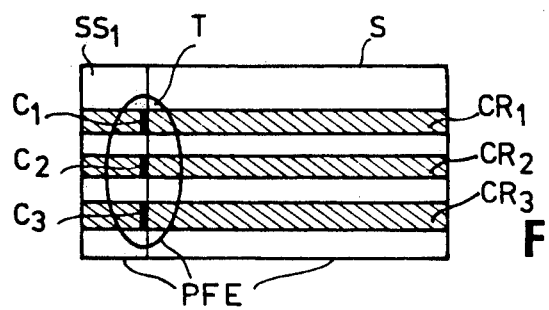
FIG:2

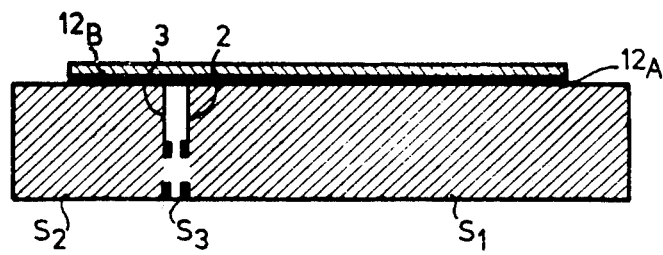
FIG: 5
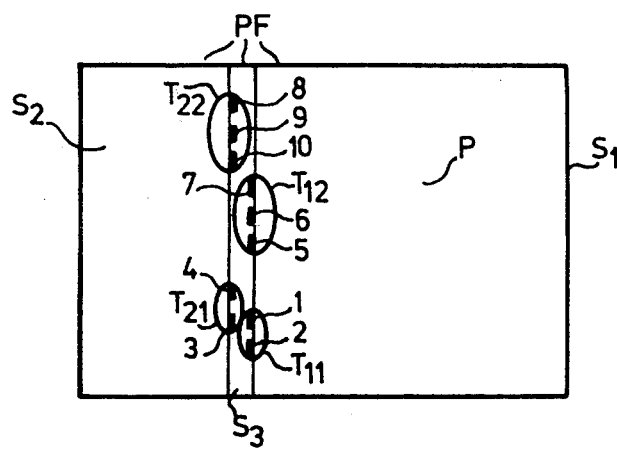
FIG: 6
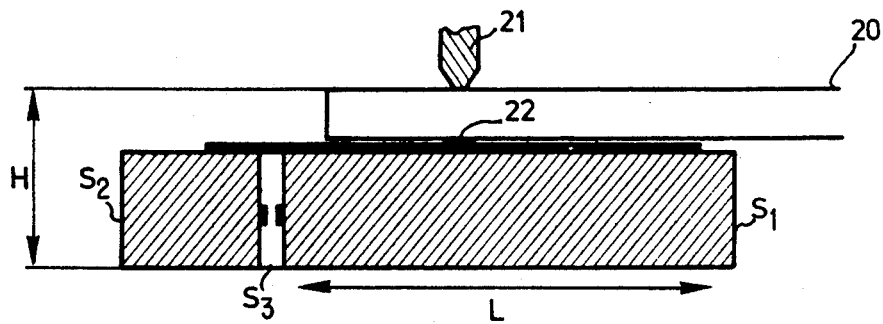
FIG: 9

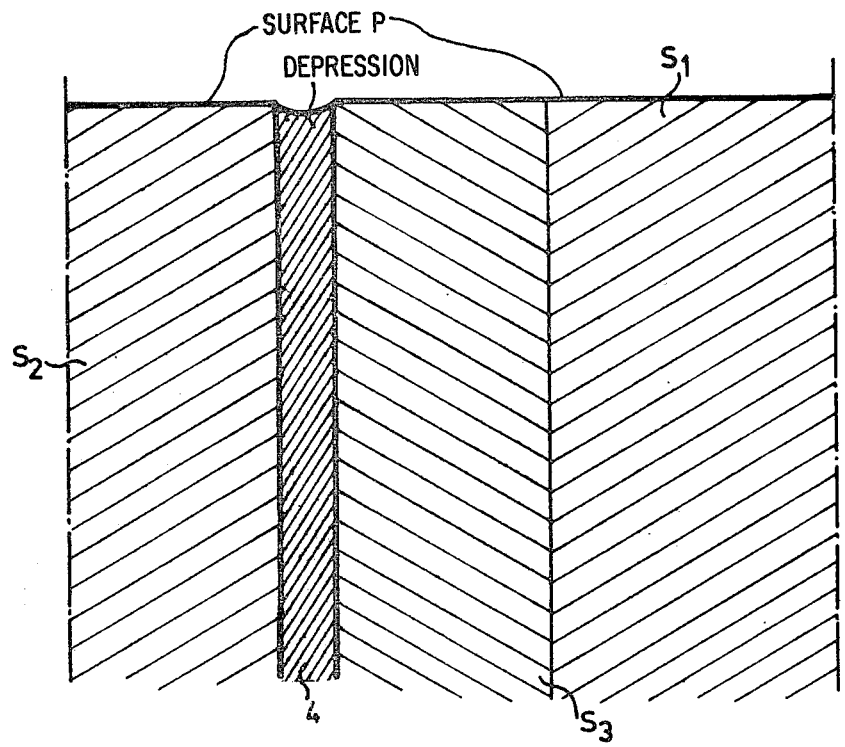
FIG:7
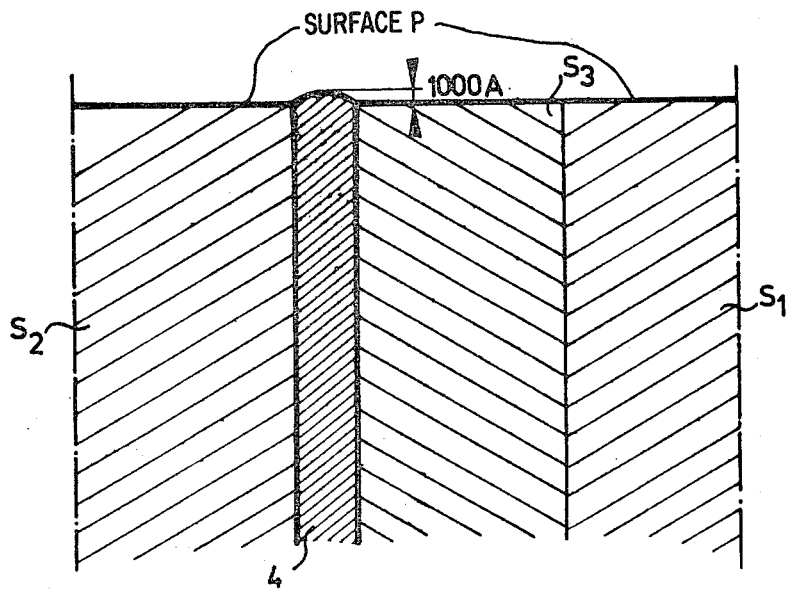
FIG:8

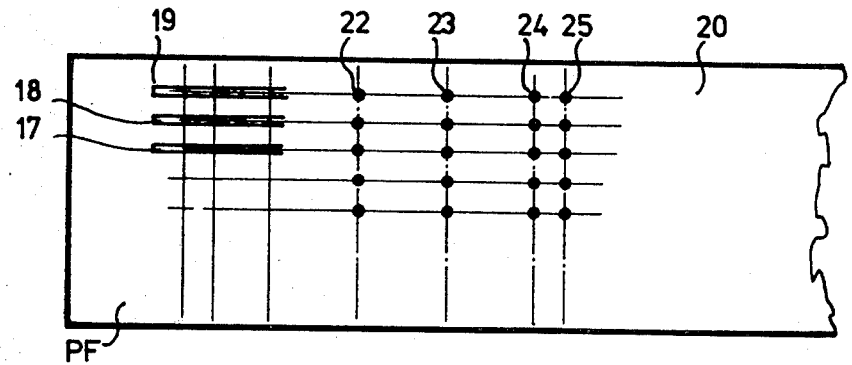
FIG:10
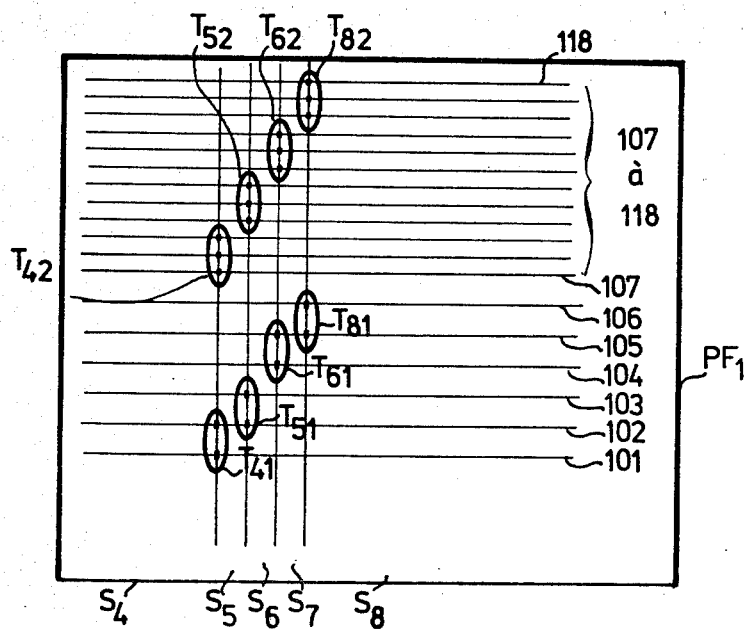
FIG:11

MAGNETIC HEAD PLATFORM INCORPORATING AT LEAST ONE INTEGRATED TRANSDUCER

BACKGROUND OF THE INVENTION

1. Field of the Invention

The present invention relates to a platform incorporating at least one integrated transducer and to a method of producing the said platform. It is more particularly applicable to integrated magnetic heads for magnetic peripherals of data-processing systems, in particular disc memories.

2. Description of the Prior Art

In present day data-processing systems, use is more and more frequently being made of magnetic disc memories because of their storage capacity and the relatively short time taken by magnetic read/write heads to either store information on the discs or to access information contained anywhere on the discs from the moment when the heads receive an order to store or access this information from the said processing system.

Magnetic discs carry information on concentric circular recording tracks whose width, measured across the diameter of the disc, does not exceed a few hundredths of a millimeter. These recording tracks are situated on both faces of the discs. The discs are driven in rotation at constant speed by an electric motor and to enable information to be written or read, the magnetic heads are arranged at a distance of a few microns above either face of the discs. In current practice, it is usual for only one magnetic head to be associated with each face of the discs.

Rotation of the discs results in the existence of a cushion or compressed air between each head and the face of the disc associated with it. This cushion prevents the head from touching the disc and thus damaging it. The head is therefore said to "fly" above the face of the disc.

The present day trend in the development of magnetic discs with improved performance characteristics is to increase both the radial density and the longitudinal density of the information on the discs, the radial density being the number of tracks per unit length measured across the diameter of the disc and longitudinal density being the number of items of information per unit length measured circumferentially along a track.

An increase in radial density is feasible by reducing the width of the item of information and by the reduction, which the latter makes possible, in the width of the tracks. Similarly, a reduction in the length of an item of information makes it possible to increase longitudinal density. The width of the tracks and the length of an item of information are of the order of a few microns.

Low-cost magnetic heads are known which enable information to be read from and written onto magnetic discs on which both the radial and longitudinal densities are high. Typical are the integrated magnetic heads which are also known as integrated magnetic transducers. A magnetic head of this kind is described, for example, in French Patent No. 2,063,693, entitled "An Integrated Magnetic Head and a Method of Producing the Said Head" and its corresponding U.S. Pat. No. 3,723,665.

The head contains a magnetic circuit formed by two superimposed magnetic layers which are connected at one end while at the other end, which is close to the face of the disc which is associated with them, the layers are arranged substantially perpendicular to the face to form the pole-gap. The magnetic circuit also includes an electrical read and/or write winding between the magnetic layers formed from conductive layers which are superimposed in a direction perpendicular to the plane of the magnetic layers so that the latter form an envelope containing the conductive layers, which are separated from one another by electrically insulating layers.

An air-gap thus formed permits information to be read and written. The winding of the head generally has two, or even three, thin, stiff electrically conductive output strips which are connected by means of spot connections (spots of solder, for example) to flexible connecting wires equal in number to the strips which enable the winding to be connected electrically to the electrical read and write circuits of the disc memory.

As is described in French Patent No. 2,191,186 entitled "Improvements to Magnetic Heads and to their Mounting" corresponding to U.S. Pat. No. 3,846,841, the integrated head is embedded in a protective insulating material. The assembly formed by the head, the insulating material and the stiff, conductive output strips is covered further by an insulating layer, generally of the same kind as the substrate, which makes the stiff conductive output strips stronger mechanically. In other words, it can be said that this insulating layer is a member which provides protection for the said assembly and which supports the conductive electrical output strips mechanically. Because of its small size, it is possible to arrange a number of integrated magnetic heads on the same head-carrying platform so that they are all associated with the same face of a disc, an advantage of which is that it shortens the time taken by each head to access any item of information contained on this face. Such platforms are described, for example, in the above-mentioned U.S. Pat. No. 3,846,841.

In the majority of cases, the heads are mounted on two separate substrates one beside another, perpendicularly to the magnetic disc, and have a member for protecting them and mechanically supporting their conductive output strips which is common to them. This member also acts as a joint for the two substrates. Thus, the platform may be defined as being the assembly formed by the magnetic heads (together with their insulating material and their conductive electrical output strips), their substrates and their common protecting member. It is clear that a platform could be formed from a single substrate or from a number of substrates greater than two.

The platform so defined is generally, but not necessarily, in the form of a very shallow right-angled parallelepiped whose large faces are perpendicular to the plane of the heads, with what is termed the lower large face containing the pole-gaps of the heads and what is termed the upper large face containing the various spot connections to the conductive output strips from the head. To facilitate the description, this upper large face will be called the surface of the platform.

Together, the flexible connecting wires from each of the heads form a loop in the immediate vicinity of the surface of the platform. This has several disadvantages. For example, the loop interferes considerably with the "flying" of the head-carrying platform above the face of the magnetic disc which is associated with the heads.

Another disadvantage is that the read/write signals to and from the heads are upset by vibrations in the wires forming the loop. Further, when the disc memory contains a plurality of magnetic discs, the loop of wires takes up too much space, particularly in cases where the platform is located between two discs. Also, it should be apparent that the combination formed by the platform on the one hand and the loop of connecting wires on the other does not form a homogeneous whole structure from the point of view of its mechanical properties.

The present invention enables these drawbacks to be overcome by replacing, at the points where the spot connections to stiff conductive output strips are situated, the flexible connecting wires by stiff conductors formed by superimposing thin conductive layers deposited on the actual surface of the platform, which is roughened slightly.

SUMMARY OF THE INVENTION

In accordance with the invention, the platform comprising at least one integrated magnetic transducer which is arranged on at least one substrate made of a non-magnetic insulating material and incorporating conductive, electrical output strips, and an insulating protective member covering the transducer and the conductive electrical output strips is characterized in that the conductive electrical output strips are connected to connecting conductors each formed from at least one thin conductive layer deposited on the surface of the platform.

In a preferred embodiment of the invention, the platform includes at least two substrates between which is positioned the insulating protective member, which acts as a joint for the latter, and includes a combination of transducers arranged either quincuncially or in partial alignment, the facing conductive output strips of partially aligned transducers having common connecting conductors.

BRIEF DESCRIPTION OF THE DRAWINGS

Other features and advantages of the invention will become apparent from the following description, which is given by way of non-limiting example, and by reference to the accompanying figures.

In the drawings:

FIGS. 1a and 1b show in perspective views, an example of the construction of an integrated magnetic head;

FIG. 1c is a sectional view of the magnetic head of FIG. 1b;

FIG. 2 shows an embodiment of the platform according to the invention which has a single transducer deposited on a single substrate;

FIG. 5 is a sectional view, taken along an imaginary plane perpendicular to and cutting an output strip 12 of FIG. 4, showing the interior arrangement of said platform according to the invention;

FIGS. 6 and 7 illustrate the first and second steps in the method of producing the platform, FIG. 6 being a view from above and FIG. 7 being an enlarged fragmentary sectional view taken at the point where an output strip of an integrated head is situated;

FIG. 8 is an enlarged, fragmentary sectional view, taken at the point where an output strip of an integrated head is situated, showing the platform after the third step in the method of production. According to the present invention, FIGS. 4 and 5 also serve to illustrate the fourth and fifth steps of the method of the invention;

FIGS. 9 and 10 show two examples illustrating different ways of soldering the connecting conductors to a flexible connector directly connected to the read/write circuits of the disc memory and serve to illustrate a sixth step in the subject inventive method of production; and FIG. 11 shows another embodiment of a magnetic hard-carrying platform in accordance with the present invention which is formed from a plurality of substrates.

DESCRIPTION OF THE PREFERRED EMBODIMENTS

Figure 3:
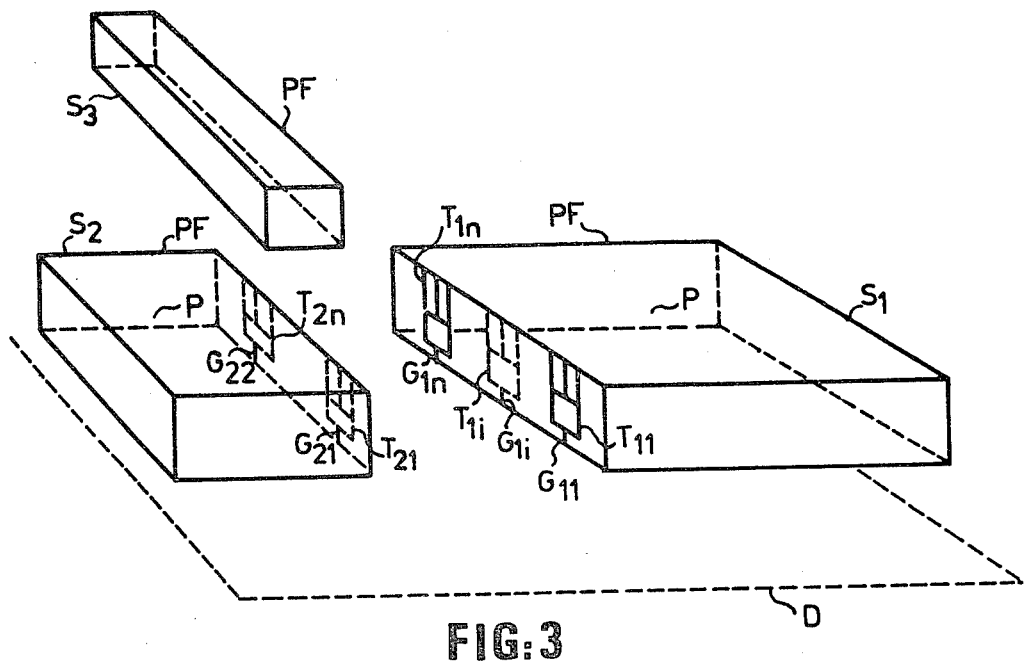
FIG. 3 shows a preferred embodiment of the present invention wherein a set of two substrates are provided each carrying a number of integrated heads.

In order better to understand the way in which the head-carrying platform according to the invention is formed, it is useful to review a few facts with respect to the principle of construction of integrated magnetic heads and to this end, reference should be made to the heads shown in FIGS. 1a, 1b and 1c. Such heads are well known and are described in aforementioned U.S. Pat. No. 3,723,665. FIGS. 1a and 1b best illustrate the principle of construction of the integrated magnetic head T shown in a considerably enlarged perspective view. The integrated head T includes a magnetic circuit which is composed of two completely superimposed thin magnetic layers CM1 and CM2 which are coupled magnetically to a winding B. The layers CM1 and CM2 are coupled together magnetostatically at a first end E1 and form a pole-gap G at the other end.

The winding B is formed by a succession of thin conductive and insulating layers stacked in a direction perpendicular to the plane of the magnetic layers, with some of the insulating and conductive layers extending between layers CM1 and CM2 as is known in the art, to lie flush at the pole gap G. Thus, although not readily apparent from the drawing, layers CM1 and CM2 are spaced slightly at the pole gap. The winding passes into the interior of the magnetic circuit and is there completely enclosed by this circuit. The winding B generally has two or three (usually three) output conductors. In the embodiment presently being described, the head T has three conductive electrical output strips C1, C2, C3 which are intended for connection to the read/write circuits of the disc memory which includes the integrated head T.

FIG. 1c is a sectional view taken at the point where strip C2 is situated, showing the integrated head T and its winding B as mounted on a substrate S which may be made of glass. The head T is covered or embedded in a protective insulating material ISP, the whole structure (head T, insulating material ISP, strips C1, C2, C3) being covered with an insulating layer SS1 of glass which increases the protection afforded by the material ISP. In other words, it can be said that the protective insulating material ISP provides primary protection for the head T while layer SS1 provides secondary protection. Layer SS1 also increases the overall mechanical strength of the strips C1, C2, C3.

It should be apparent that a large number of integrated heads similar to head T may be deposited on the same substrate S, the layer SS1 then being common to all the integrated heads as described, for example, in the above-mentioned U.S. Pat. No. 3,846,841.

The head T enclosed in its protecting material ISP, the electrical output strips C1, C2, C3, and the protective layer SS1 and substrate S together form a platform PFE carrying individual heads which is shown in a view from above in FIG. 2.

In accordance with the invention, the platform PFE includes three connecting conductors CR1, CR2, CR3 which are formed from two thin superimposed layers deposited on the surface of the substrate S, and which are connected to strips C1, C2 and C3, respectively.

FIG. 3 shows a preferred embodiment of the invention comprising two separate substrates S1 and S2 made of glass, which carry respective pluralities of integrated magnetic heads T11, T12 ... T1i ... T1n and T21, T2i ... T2n. Only a representative showing of these magnetic heads is included. Substrates S1 and S2 form a platform PF according to the invention for carrying integrated heads in such a way that all the heads T1i and T2i are arranged perpendicularly to the information carrier D (shown in broken lines in FIG. 3), which may be a magnetic disc. The pole gaps of the heads, namely G11, G1i ... G1n and G21 ... G2i ... G2n are arranged above the carrier D as shown in FIG. 3, i.e., along an axis which is perpendicular to the plane of the carrier 7.

A glass secondary protective member S3 which is common to all the heads T1i and T2i is located between the substrates S1 and S2. For clarity, member S3 is shown displaced from the two substrates. Member S3 acts as a joint for the substrates.

The heads T1i, T2i may be attached to the substrates by any known method so long as the head is not damaged or its performance affected. "Glass welding", for example, may be employed. Such a method of welding is described in U.S. Pat. No. 4,012,782 corresponding to French patent application No. 75 19167 entitled "New Structures for Integrated Magnetic Heads".

The protective member S3 is attached to the substrate S1 and S2 by the same method.

The following description of an embodiment of the invention will be directed to a platform PF formed from two substrates S1 and S2, but it should be apparent that the invention is applicable, inter alia, either to a platform which includes a single integrated head arranged on a single substrate or to a platform bearing integrated heads which is made up of a larger number of substrates, this number being a function of the number of heads which it is desired to incorporate in one and the same platform. Accordingly, the description should be considered illustrative of the invention and not limiting thereof.

To simplify the description, it will be assumed that the number n of heads carried by each of the substrates S1 and S2 is equal to two. This being the case, substrates S1 carries heads T11 and T12 and substrates S2 carries heads T21 and T22, as can be seen in FIG. 4.

Figure 4:
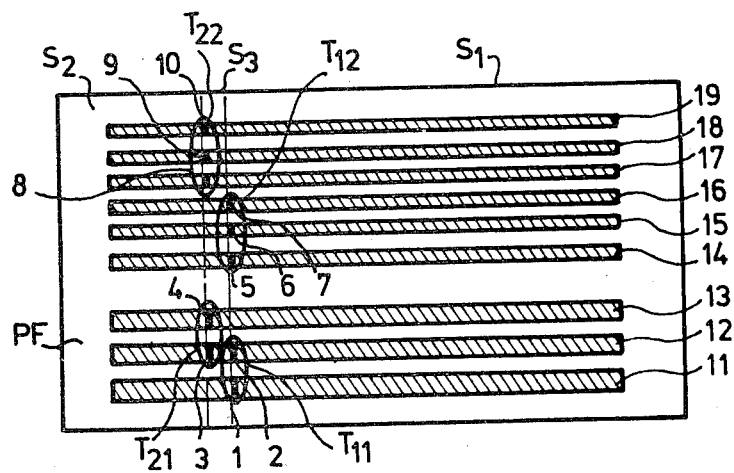
FIG. 4 is an overhead view showing the platform of FIG. 3, together with its thin-layer connecting conductors.

Referring to FIG. 4, the heads T11 and T21 each have two conductive electrical output strips which are marked 1 and 2, 3 and 4, respectively. Heads T12 and T22 each have three output strips, these being 5, 6, 7 and 8, 9, 10, respectively. The strips 1 to 10 are generally made of copper. The heads T12 and T22 which have three output strips each are preferably positioned in a so-called quincuncial arrangement with none of the strips 5, 6, 7 situated facing any one of the strips 8 to 10, whereas heads T11 to T22, which have two output strips, are said to be "partially aligned", the conductors 2 and 3 being positioned facing one another and are in a plane parallel to the axis of the conductors.

In accordance with the invention the platform PF includes nine connecting conductors 11 to 19 which are each formed from two thin superimposed layers deposited on the surface P of the platform. As hereinbefore noted, surface P is the upper large face of the platform PF, i.e., the face of the platform away from the carrier D.

As regards the quincuncially arranged heads T12 and T22, each connecting conductor corresponds to one output strip.

Thus, connecting conductor 14 is connected to output strips 5 of head T12, connecting conductor 15 to strip 6 of the same head, and so on up to connecting conductor 19 which is connected to output strip 10 of head T22.

In the case of the partially aligned heads T11 and T21, connecting conductor 12 is shared by output strips 2 and 3, connecting conductors 11 and 13 being connected to output strips 1 and 4 respectively.

As can be seen in FIG. 5, which is a sectional view of platform PF taken at the point where connecting conductor 12 is situated, the connecting conductor is formed by superimposing a first thin layer 12A of a conductor material which adheres well to glass, such as chromium, molybdenum or titanium, and a second thicker layer 12B of a conductive material such as copper.

The way in which the platform PF is formed will be better understood from the following description of the method of producing it. This method consists of the following steps:

(1) First Step

The substrates S1 and S2 are welded together, using the "glass welding" technique described in the above-identified U.S. Pat. No. 4,012,782, by means of the glass protective member S3, (shown separate in FIG. 3 for clarity), but it is clear that the protective member S3 (which may be formed from a material other than glass) may be attached to the two substrates by a method other than "glass welding" such as by brazing or by bonding with araldite.

(2) Second Step (FIGS. 6 and 7)

The surface P of the platform PF is ground, for example, by the known technique of a rotary disc carrying diamond dust, so as on the one hand to expose the cross-sections of the conductive electrical output strips 1 to 10 of heads T11, T12, T21 and T22 and on the other hand so that the surface is slightly roughened.

If a section is taken through the platform PF on a considerably enlarged scale, at the point where one of the strips 1 to 10 (strip 4, for example) is situated after the surface P has been ground, a slight depression will be seen as shown in FIG. 7. This depression appears during the grinding operation, because copper, being softer than glass, is attached more rapidly.

To facilitate the connection of the output strips 1 to 10 to conductors 11 to 19, it is necessary to get rid of this depression, which is the object of the third step in the method of manufacturing the platform PF.

(3) Third step (FIG. 8)

The surface P is attacked by a selective chemical medium based on hydrofluoric acid which attaches the glass more rapidly than the copper strips 1 to 10. From FIG. 8 (which is also a cross-sectional view of the platform taken at the point at which strip 4 is situated) it can be seen that the output strips 1 to 10 from heads T11, T12, T21 and T22 project slightly above the surface P of the platform PF (by approximately 1000 Å).

It is then possible to connect the strips 1 to 10 to the conductors 11 to 19 deposited on the roughened surface P.

(4) Fourth Step (see FIGS. 4 and 5)

A very shallow layer of chromium 12A (approximately 500 Å thick) is then deposited on surface P by vaporization in a vacuum (or by sputtering). Besides its very good adhesion to glass, chromium is selected because it allows good contacts to be made with external conductors and its price is relatively low.

(5) Fifth Step (See FIG. 5)

In the same vacuum vaporization cycle a layer of copper approximately 2 microns thick is deposited on the layer of chromium; however, any other conductive material would also be suitable. The two layers, of chromium and copper, are deposited through the same mask (not shown) to form connecting conductors 11 to 19. It can be seen from FIGS. 5 and 8 that the contact between the outlet strips 1 to 10 of the magnetic heads and the connecting conductors 11 to 19 takes place at 90° at the point where the edge of each outlet strip projects beyond the plane of the surface P.

(6) Sixth Step (FIGS. 9 and 10)

A flexible connector 20 is thereafter joined by soft soldering or any other suitable type of soldering to all the connecting conductors 11 to 19. The connector 20 incorporates several pre-tinned conductors which are not visible in FIG. 9, but which are present in number equal to the number of connecting conductors 11 to 19. The spacing between the pre-tinned conductors is identical to the spacing between conductors 11 to 19 so that one pre-tinned conductor is connected to each of the conductors 11 to 19.

Before soldering the flexible connector 20 to the set of connecting conductors, it is necessary to position the flexible conductor above the two substrates S1 and S2 in such way that its pre-tinned conductors and the connecting conductors 11 to 19 are exactly superimposed. As soon as this superimposition is achieved, the connector is soldered by heating it, by means of a heating bit 21, for example.

It is possible either to make the soft-soldered joint for the entire distance L for which the platform PF is overlapped by the connector 20 and to each of the conductors 11 to 19, or to make the joint by spot soldering each on soldering lines such as the lines 22 to 25 shown in FIG. 10, the number of soldered spot-joints on each line being equal to the number of connecting conductors. In both of the above two cases, the connecting conductors 11 to 19 are all soldered to the flexible conductor 20 simultaneously.

It can be seen that the flexible conductor 20 has two functions:

(a) to connect the heads electrically to the read/write circuits of the disc memory, and (b) to attach the platform mechanically by means of the spots or lines of solder, so it is able to "fly" above the magnetic disc.

In FIG. 11 there is shown a platform PF formed from five glass substrates S4 to S8. A protective insulating member such as S3, is positioned between each of these substrates but the protective members are not shown in order to simplify the figure.

The platform PF1 contains four partially and four non-aligned or non-facing heads. The four partially aligned heads T41, T51, T61, and T81, have two output strips each. At least one strip of each head is connected to one of connecting conductors 101 to 106. Conductors 102 and 105 are common to heads T41, T51, and T61, T81, respectively, and are connected to the other strip of these heads. The four non-facing or quincuncially positioned heads T42, T52, T62, T82, each have three output strips connected and each output strip is independently connected to one of conductors 107 to 118.

In the two illustrated embodiments of magnetic head-carrying platform, the total height H of the combination formed by the platform (see FIG. 9, for example) and the flexible connector 20 is in the order of 1 to 2 millimeters. This height is thus reduced to the absolute minimum and has the advantage of enabling the platform to be situated at a short distance from the disc.

The advantages of the head-carrying platform according to the invention should be readily apparent. For example, the electrical connection between the connector 20 and the connecting conductors 11 to 19 may be made by collective soldering, which facilitates mass production and thus low cost. This conection also minimizes the connecting stresses betwen the flexible conductor 20 and the platform PF. Also, cross-talk problems are minimized by using parallel flat connectors, which substantially reduces parasitic inductance between the various conductors.

While the invention has been described in connection with particular embodiments, it should be recognized and apparent that said description is illustrative of the invention and should not be taken as limiting the invention, the true spirit and scope of which is defined by the appended claims.

We claim:

1. A magnetic head-carrying platform comprising at least one substrate made of non-magnetic insulating material, at least one integrated magnetic transducer supported to said substrate, said transducer having conductive electrical output strips extending therefrom, a protective insulating member covering the transducer and the output strips and means for connecting the output strips to a connector, said means comprising thin layer conductors deposited on a surface of the substrate, said surface being perpendicular to the plane of the transducer.

2. A platform according to claim 1 wherein said thin layer conductors comprise superimposed layers of conductive material.

3. A platform according to claim 2 wherein the outermost of the superimposed layers is thicker than the underlayer.

4. A platform according to claim 2 wherein said superimposed layers include a first layer selected from the group consisting of chromium, molybdenum and titanium and a second layer of copper.

5. A platform according to claim 2 wherein said superimposed layers include a first layer approximately 500 Å thick and a second layer approximately 2 microns thick.

6. A platform according to claim 5 wherein the first layer is selected from the group consisting of chromium, molybdenum, and titanium.

7. A platform according to claim 6 wherein said first layer is chromium and said second layer is copper.

8. A magnetic head-carrying platform according to claim 1 wherein said protective insulating member and said substrate are glass.

9. A magnetic head-carrying platform comprising a plurality of substrates made of non-magnetic insulating material, a plurality of integrated magnetic transducers each having conductive electrical output strips and a protective insulating member, each insulating member being disposed between said substrates and forming a joint for the substrates and supporting said transducers between said substrates and in a plane perpendicular to a major flat surface of the substrates, said at least two of said transducers being in partial alignment, at least two further transducers being quincuncially arranged, means for connecting the output strips of each transducer to a connector, such that said transducers in partial alignment have one output strip connected to the connector by a common conductor.

10. A platform as set forth in claim 9 wherein said output strips extend to said major surface and said means for connecting the output strips comprises a layer of conductors deposited on said major flat surface.

11. A platform as set forth in claim 10 wherein said layer of conductors comprise superimposed layers of conductive material.

12. A platform as set forth in claim 11 wherein the outermost layer of the superimposed layers is thicker than the underlayer.

13. A platform as set forth in claim 12 wherein said superimposed layers include a first layer selected from the group consisting of chromium, molybdenum and titanium and a second layer of copper.

14. A platform as set forth in claim 12 wherein said superimposed layers include a first layer approximately 500 Å thick and a second layer approximately 2 microns thick.

15. A platform as set forth in claim 14 wherein said first layer is selected from the group consisting of chromium, molybdenum and titanium.

16. A platform according to claim 15 wherein said first layer is chromium and said second layer is copper.

17. A magnetic head-carrying platform as set forth in claim 1 wherein said non-magnetic substrate includes at least one major flat surface adapted to be positioned parallel to an information carrier and supports said transducer in a plane perpendicular to said major flat surface.

18. A magnet head-carrying platform comprising a first and a second substrate, each said substrate being of non-magnetic material, a joint of non-magnetic material conecting said substrates, each said substrate having a major flat surface adapted to be positioned parallel to an information carrier and supporting at least one transducer in a plane perpendicular to said major flat surface, each said transducer having a pair of output strips extending in a plane perpendicular to said major flat surface and terminating at said major flat surface, and a thin layer of conductors deposited on said major flat surface connected to said output strips at the termination thereof.

19. A magnetic head as set forth in claim 18 further including a flexible connector having a plurality of conductors each connected to a corresponding one of said layer of conductors deposited on said major flat surface.

20. A platform as set forth in claim 18 wherein said layer of conductors comprise superimposed layers of conductive material.

21. A platform as set forth in claim 18 wherein the outermost layer of the superimposed layers is thicker than the underlayer.

22. A platform as set forth in claim 18 wherein said superimposed layers include a first layer selected from the group consisting of chromium, molybdenum and titanium and a second layer of copper.

23. A platform as set forth in claim 18 wherein said superimposed layers include a first layer approximately 500 Å thick and a second layer approximately 2 microns thick.

24. A platform as set forth in claim 18 wherein said first layer is selected from the group consisting of chromium, molybdenum and titanium.

25. A platform according to claim 18 wherein said first layer is chromium and said second layer is copper.

* * * * *

UNITED STATES PATENT AND TRADEMARK OFFICE
CERTIFICATE OF CORRECTION

PATENT NO. : 4,198,667
DATED : April 15, 1980
INVENTOR(S) : LAZZARI, Jean-Pierre, et al.

It is certified that error appears in the above-identified patent and that said Letters Patent are hereby corrected as shown below:

(73) "Compagnie Internationale pour l'Informatique" should be -- Compagnie Internationale pour l'Informatique Cii-Honeywell Bull (Societe Anonyme) --.

Signed and Sealed this

Twenty-first Day of April 1981

[SEAL]

Attest:

RENE D. TEGTMEYER

*Attesting Officer*    *Acting Commissioner of Patents and Trademarks*